July 28, 1953  J. P. ROBERTSON  2,646,657
MULTIPLE LIFT TYPE DISK HARROW
Filed June 29, 1948  5 Sheets-Sheet 1
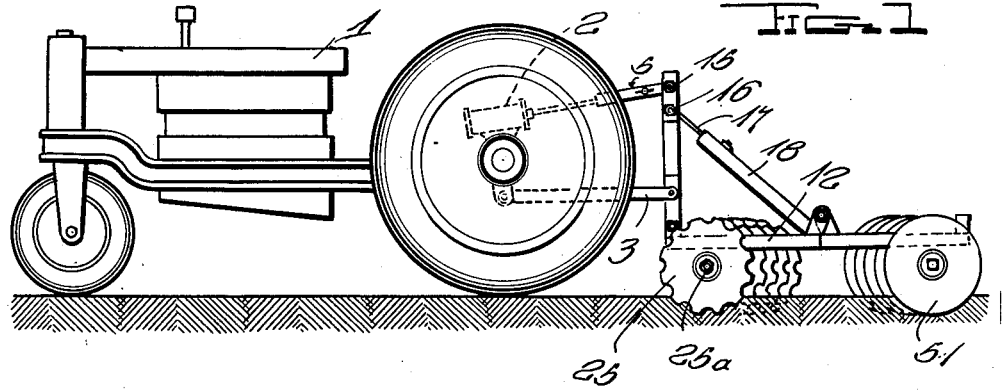
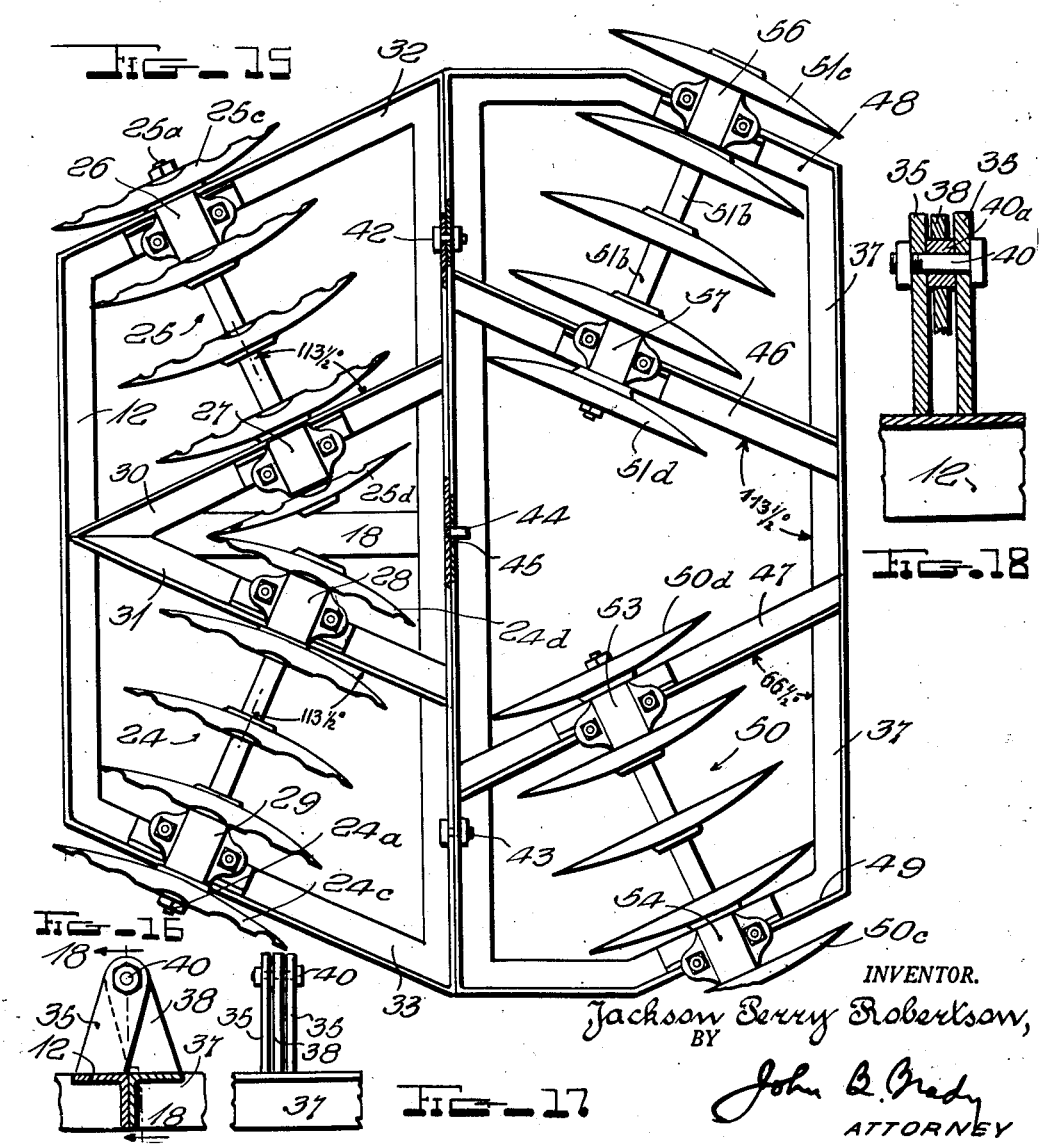
INVENTOR.
Jackson Perry Robertson,
BY
John B. Brady
ATTORNEY

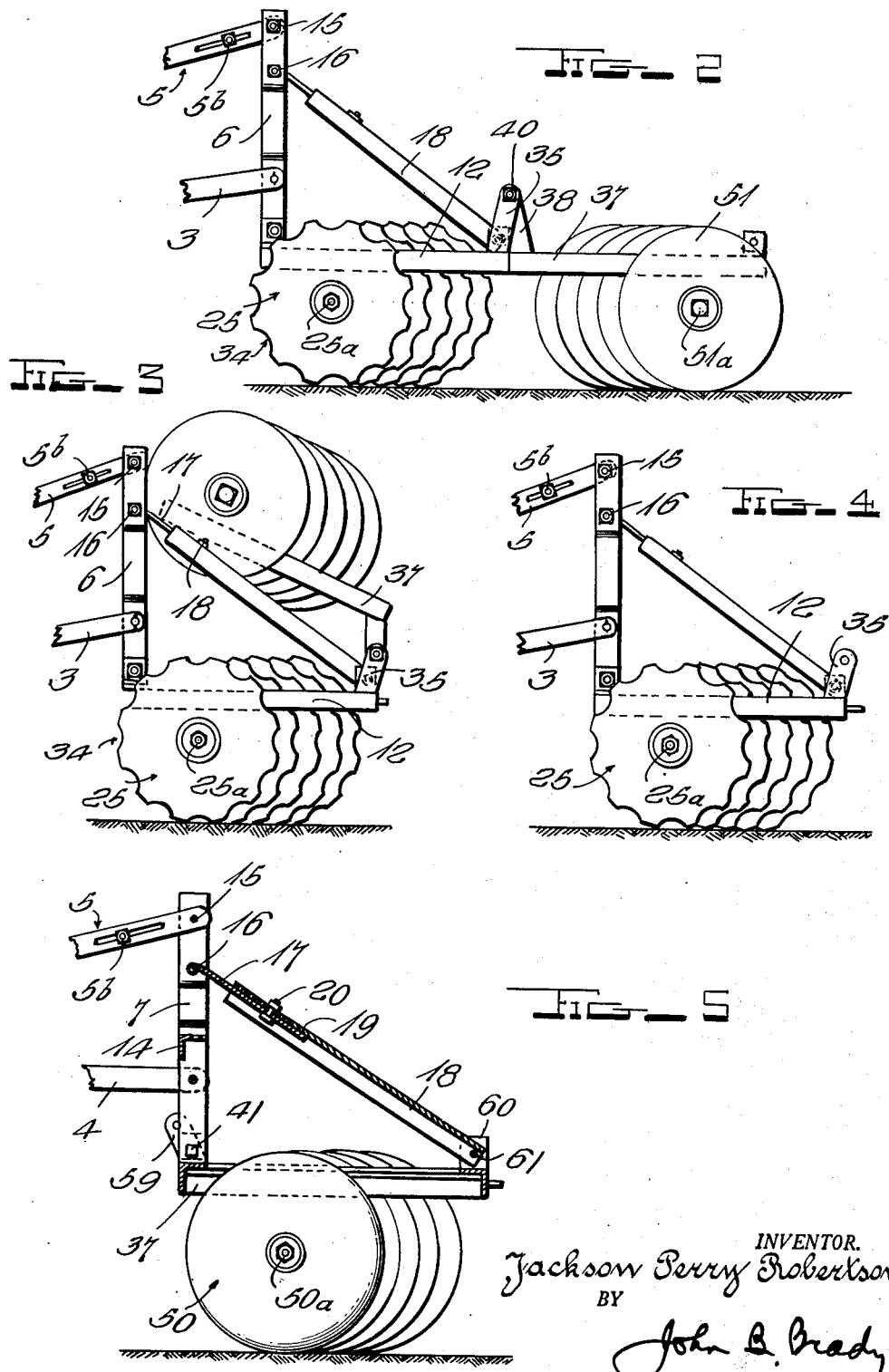

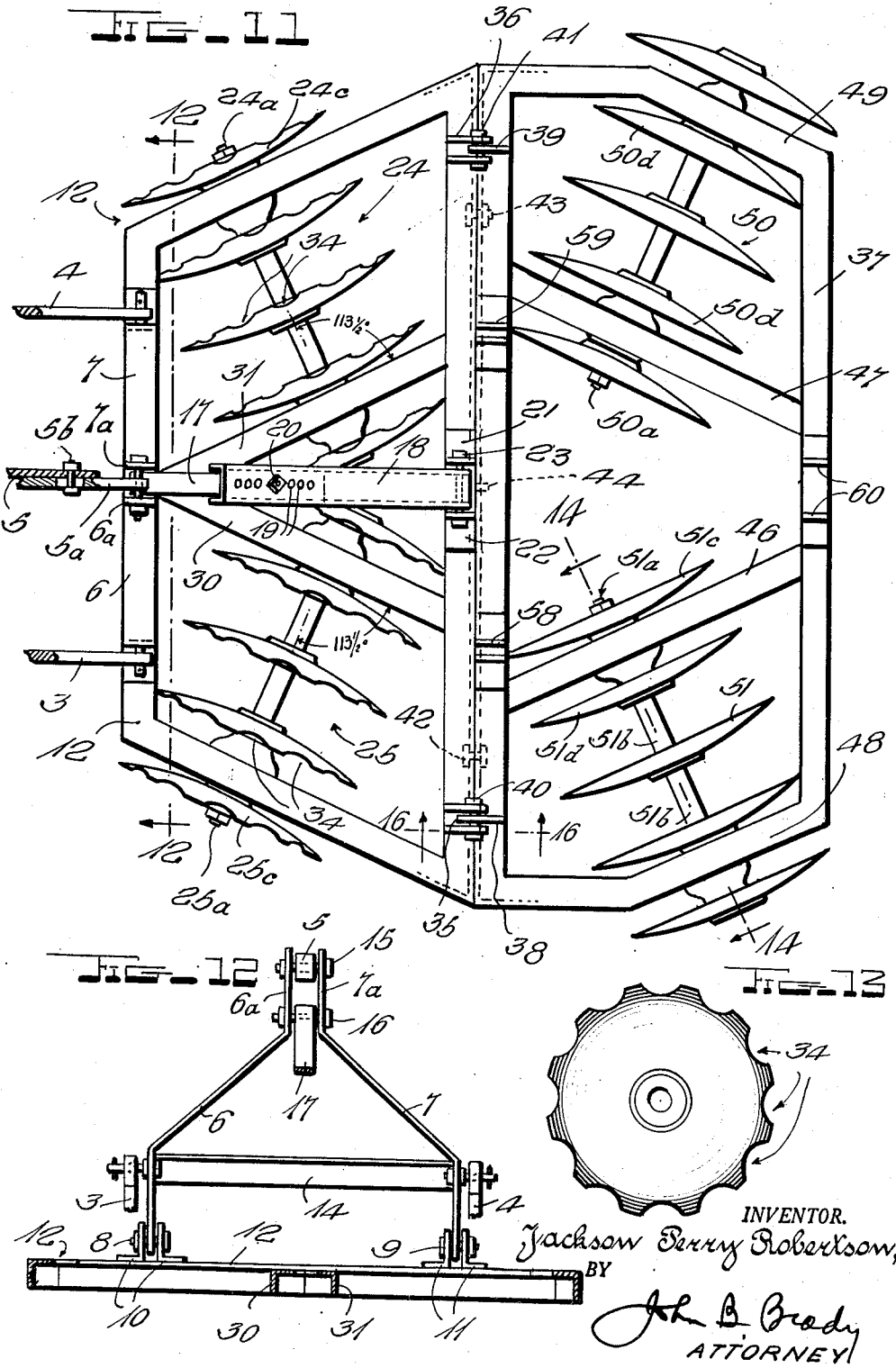

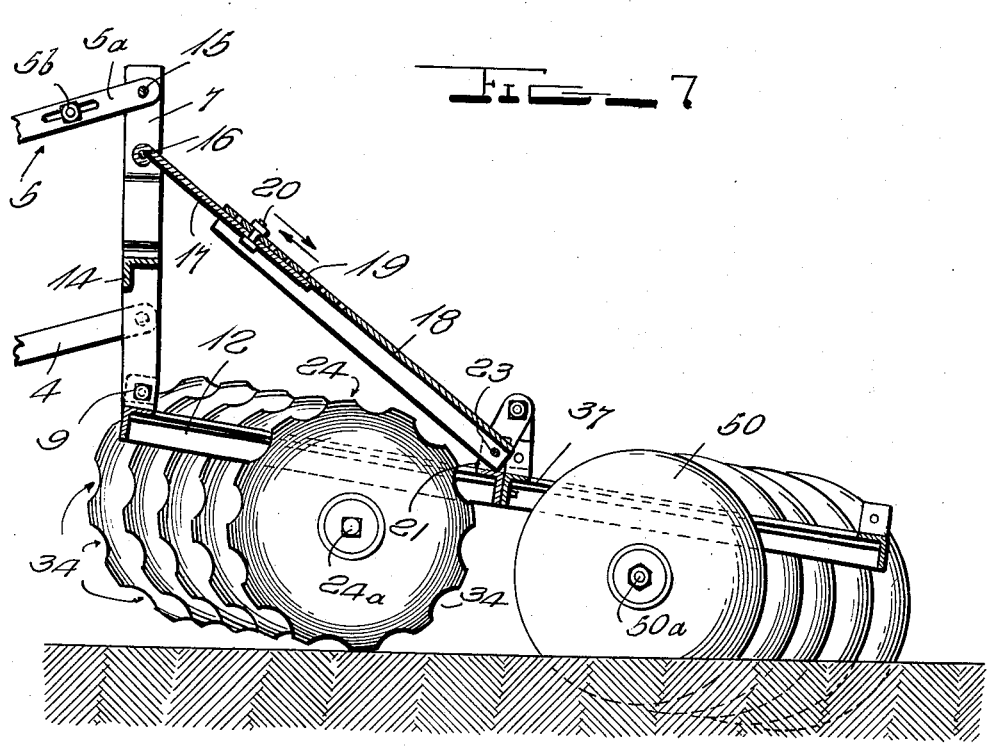
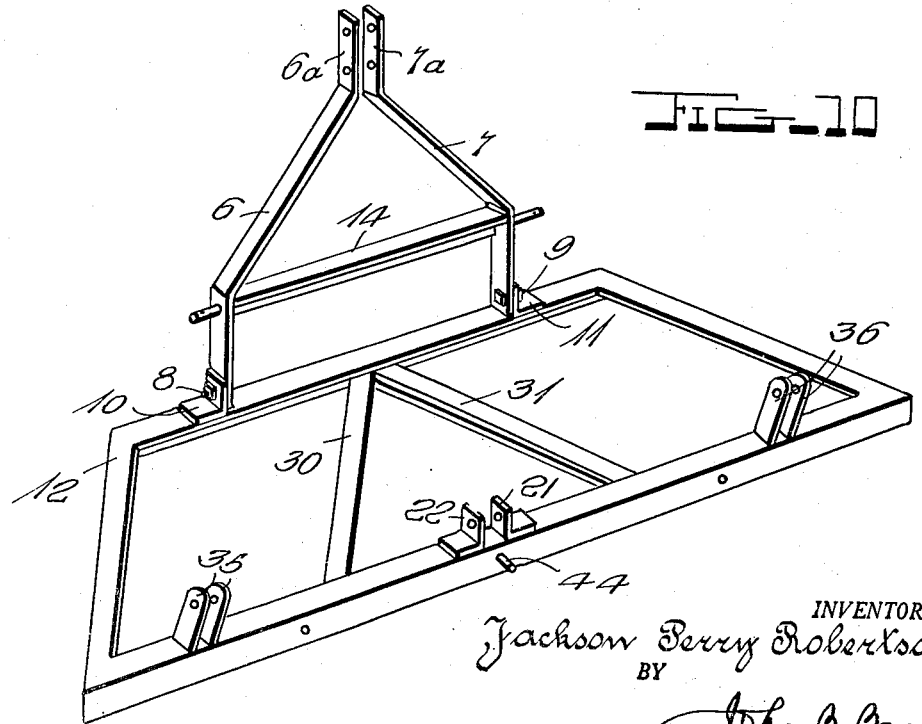

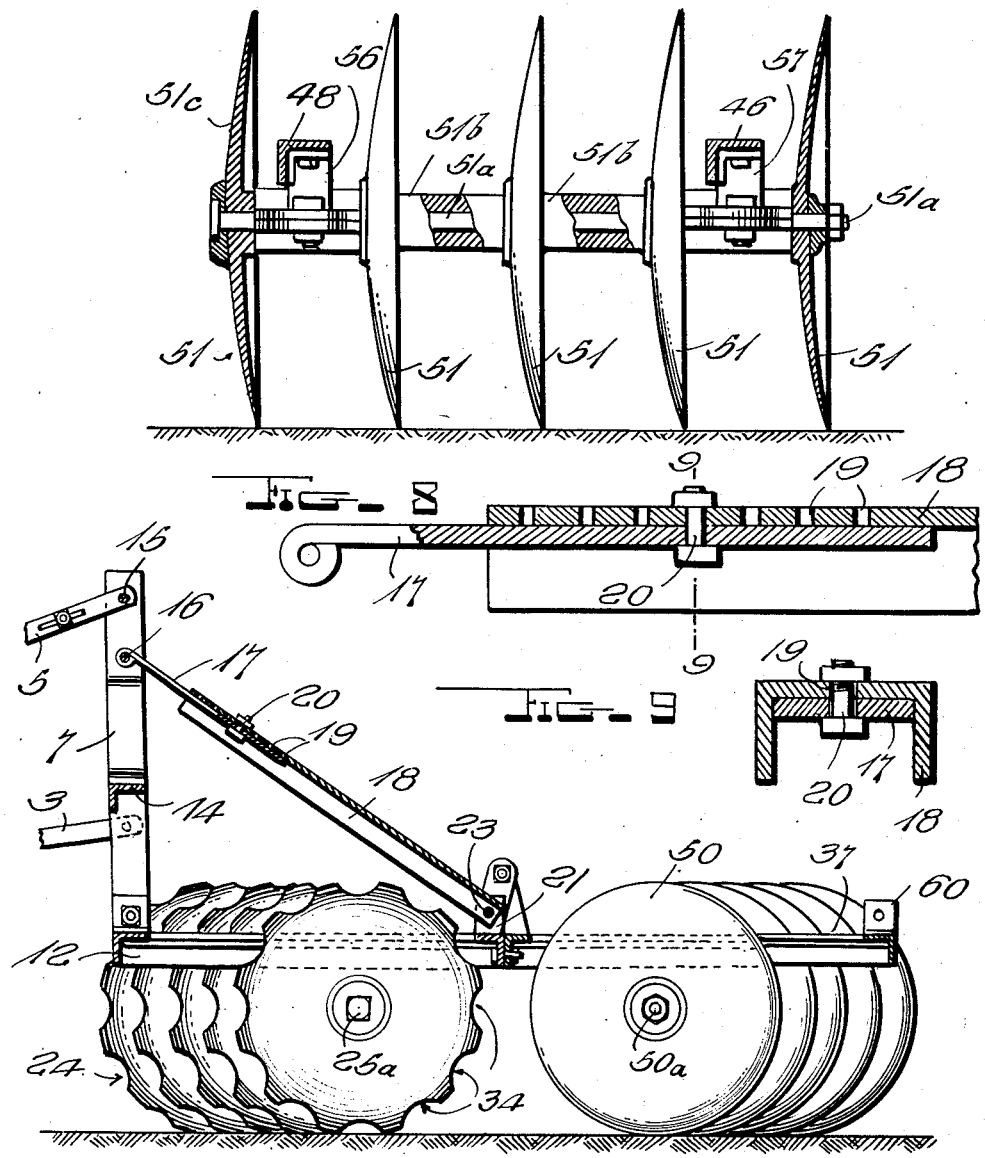

Patented July 28, 1953

2,646,657

UNITED STATES PATENT OFFICE 2,646,657

MULTIPLE LIFT TYPE DISK HARROW

Jackson Perry Robertson, Columbus, Miss.

Application June 29, 1948, Serial No. 35,805

4 Claims. (Cl. 55—30)

My invention relates broadly to agriculture implements and more particularly to a lift type multi-disc harrow.

One of the objects of my invention is to provide a construction of harrow which may serve a multiplicity of functions in properly preparing the ground for planting according to a wide variety of earth of differing characteristic.

Another objects of my invention is to provide an improved construction of harrow having a multiplicity of gangs of discs mounted in units which may be rendered effective in individual or multiple sections in pulverizing the ground.

Another object of my invention is to provide a construction of harrow comprising a multiplicity of hinged frames each carrying gangs of discs wherein the frames may be folded from a coplanar position to a position one over the other for selectively rendering certain of the gangs of discs effective while certain of the other gangs of discs are ineffective in harrowing operations.

Still another object of my invention is to provide a construction of multiple lift type disc harrow comprising at least a pair of coacting frame members each having tractor attachment means at the front thereof and operative for individual connection to a tractor or tandem connection coupled with respect to each other and with the tractor and supporting gangs of discs of differing characteristics which may be rendered effective as an individual unit or collectively as a coacting unit in the pulverizing of the earth.

Still another object of my invention is to provide construction of disc type harrow including at least a pair of coacting frame members coupled with each other and adapted to be connected with a tractor in which one of the frame members is constructed in sections and hingedly connected with a co-acting frame member, said frame member and the sections carrying gangs of discs adapted to be rendered selectively effective in operating upon the earth.

Still another object of my invention is to provide an arrangement of multiple lift type disc harrow having co-acting frame members adapted to be connected with each other and drawn by a tractor and each supporting gangs of discs with means for adjusting the depth of penetration of the gangs of discs into the earth in performing a harrowing operation.

Other and further objects of my invention reside in the improved construction of multiple lift type disc harrow as set forth more fully in the specifications hereinafter following by reference to the accompanying drawings, in which:

Figure 1 shows the multiple lift type disc harrow of my invention drawn by a tractor; Fig. 2 is an enlarged side elevational view showing the multiple frame construction of the harrow carrying gangs of discs where the frames are moved to coplanar position for effectively utilizing all of the gangs of discs; Fig. 3 is an elevational view illustrating the rear frame section moved to a position in which the center of gravity of the mass of the rear gangs of discs is disposed over the front frame structure for concentrating the weight of all of the gangs of discs in the front frame structure for performing a deep harrowing operation; Fig. 4 is a side elevational view showing the front frame section of the harrow utilized without the coupled rear frame section for performing a lighter harrowing operation; Fig. 5 is a side elevational view showing the rear frame section utilized alone in connection with the tractor and with the front frame section wholly removed; Fig. 6 is an enlarged longitudinal section view through the harrow where the two frame sections are operating in coplanar relation for co-action of all of the gangs of discs; Fig. 7 is a view similar to the view shown in Fig. 6 for illustrating more particularly the adjustment means for controlling the depth of penetration of the gangs of discs into the earth during a harrowing operation; Fig. 8 is a fragmentary side elevational view of the adjustment bar employed for controlling the depth of penetration of the gangs of discs, certain of the parts being broken away and illustrated in longitudinal section; Fig. 9 is a transverse sectional view through the adjustment bar taken on line 9—9 of Fig. 8; Fig. 10 is a perspective view of the front frame member and showing more particularly the connection means to the tractor; Fig. 11 is a top plan view of the front and rear frame members showing the arrangement of the gangs of discs carried thereby and broken away and shown in section at the coupling means to the tractor; Fig. 12 is a transverse sectional view taken on line 12—12 of Fig. 11 and showing the front frame member in section and illustrating the coupling means to the tractor in elevation; Fig. 13 is a detailed view of one of the harrow discs employed in the gangs of discs in the front frame member; Fig. 14 is an enlarged sectional view through one of the gangs of discs carried by the rear frame member, the view being taken substantially on line 14—14 of Fig. 11; Fig. 15 is a bottom plan view of the front and rear frame members and showing the co-acting relation of the gangs of discs carried thereby; Fig. 16 is a transverse sectional view through the connection means for the front and rear frame members taken substantially on line 16—16 of Fig. 11; Fig. 17 is a detailed view of the hinge employed between the front and rear frame members; and Fig. 18 is a vertical sectional view on a somewhat enlarged scale taken substantially on line 18—18 of Fig. 16.

Referring to the drawings in detail, and particularly Fig. 1, reference character 1 designates the conventional tractor having a hydraulic lift mechanism 2 thereon connected through links 3, 4 and 5 with the harrow. Links 3 and 4, as illustrated more particularly in Fig. 11, form coupling means adjacent the base of the hydraulic lift of the harrow while link 5 extends from the top of the hydraulic lift and connects to the coupling means between the harrow and the tractor. The coupling means for the harrow comprises a substantially vertically extending frame formed by a pair of strips shown more clearly in Fig. 10 at 6 and 7, pivotally mounted at 8 and 9 on brackets 10 and 11 carried by front frame member 12. The strips 6 and 7 are provided with a substantially horizontally extending brace 14 therebetween and are tapered or angularly disposed upwardly terminating in a pair of inter-connecting faces 6a and 7a which are connected through bolt members 15 and 16 secured by nuts at the ends thereof. Bolt member 15 provides a connection means for the link 5 leading to the hydraulic lift through suitable adjustment means such as link 5a and adjusting bolt 5b.

Bolt 16 provides connection means for the adjustment bar 17 shown more particularly in Fig. 8. Adjustment bar 17 is coupled to channel-shaped brace member 18 which is apertured at spaced intervals represented at 19 to receive the bolt 20 in a selected position for effectively lengthening or shortening the adjustment bar. The channel-shaped member 18 is pivotally connected to the bracket members 21 and 22 carried adjacent the rear of the front frame member 12. Bolt 23 extends through channel-shaped bar 18 and vertically disposed brackets 21 and 22 for forming a pivotal connection for channel 18. Inasmuch as the vertically extending coupling means 6 and 7 are pivotally connected at 8 and 9 adjacent the front of frame member 12, lengthening of the adjustment means formed by adjustment bar 17 and co-acting channel 18 operates to incline the frame member 12 downwardly adjacent the rear thereof as represented in Fig. 7 for controlling the depth of penetration of the gangs of discs shown at 24 and 25 carried by the front frame member 12.

The gangs of discs 24 and 25 are supported beneath the front frame member 12 by means of depending brackets shown more clearly in Fig. 15 at 26, 27 and 28, 29 serving as a rigid support for the gangs of discs. The front frame member 12 is of rigid construction and extends in a substantially horizontal plane which is rigidly braced by angularly disposed substantially horizontal angular members 30 and 31 extending respectively parallel to the inclined side members 32 and 33 of the front frame member 12. The front frame member 12 tapers outwardly from a relatively narrow dimension at the front of the front frame member 12 to a relatively wide dimension at the rear of the front frame member 12. That is to say, the front frame member 12 is substantially trapezoidal in contour.

The gangs of discs 24 and 25 in the front frame member 12 are of scalloped contour as represented more particularly in Fig. 13 at 34 to facilitate the penetration of the discs into the earth, the cutting of roots and the pulverization of the ground during the harrowing operation. It will be observed that the gangs of discs 24 and 25 are disposed at angles with respect to each other. I have determined after extended experimentation that the shafts 24a and 25a carrying the gangs of discs 24 and 25 are most effective when mounted at an angle of 113½° to the plane of the supporting angles 30, 32 and 31, 33.

The front frame member 12 carries lug members 35 and 36 adjacent the rear thereof which provide hinged coupling means for the rear frame member shown at 37. The rear frame member 37 is also of rigid construction and is formed by angle members extending in a substantially horizontal plane which under normal conditions of use of the harrow in tandem arrangement is disposed coplanar with the plane of the front frame member 12. Rear frame member 37 is provided with upwardly extending angular disposed lug members 38 and 39 which are inclined at an angle to the front portion of the frame member 37 and extend between the lugs 35 and 36 at the rear of the front frame member 12. At the position in which the upper extremities of lugs 35 and lug 38 are aligned they are interconnected by bolt members 40 and 41 shown more particularly in Fig. 18. Each bolt member carries a sleeve bushing represented at 40a in Fig. 18 over which the co-acting lug member represented at 38 in Fig. 18 is journalled so that rear frame member 37 may be maintained in a position coplanar with front frame member 12 and rigidly interconnected therewith by coupling bolts 42 and 43 which extend through the depending flanges of abutting angles of the front frame member 12 and the rear frame member 37 when the frame members are in coplanar position. A pin member 44 carried by the rear portion of the front frame member 12 extends through a co-acting aperture 45 in the front portion of the rear frame member 37 for facilitating the aligning of the rear frame member 37 with the front frame member 12 in coplanar substantially horizontal relation.

The rear frame member 37 includes angularly disposed angle members 46 and 47 which extend in substantially parallel spaced relation to the ends of the rear frame member 37 at 48 and 49 and provides supports for the gangs of discs represented at 50 and 51. Discs 50 are carried by a shaft member 50a which is supported in depending brackets 53 and 54 from the under-side of the rear frame member 37. Similarly, the discs 51 are supported on shaft member 51a carried in depending brackets 56 and 57 extending beneath the rear frame member 37. For most effective operations I have found that the alternate shafts 51a and 24a in the rear and front frame members should extend in parallel spaced relation to each other. Similarly, alternate shafts 50a and 25a on the rear and front frame members 37 and 12 extend in parallel spaced relation. The planes of the discs 51 are disposed at 113½° with respect to the rear of the rear-end member 37. The shafts 50a and 51a are set up at an angle of 66½° to the supporting angles at 47, 49 and 46, 48. That is to say, the discs 25 in the front frame member 12 are disposed in an angular direction opposite to the angular direction of the discs 51 in the rear frame member 37. Similarly, the discs 24 in the front frame member 12 are disposed at an angle with respect to the discs 50 in the rear frame member 37. Thus, the coacting discs, when the frames are arranged in coplanar relation as shown particularly in Figs. 1 and 2, operate in bush and bog relation.

Fig. 14 illustrates a typical method of mounting the gang of discs 51 wherein shaft 51a is supported in depending brackets 56 and 57 extending beneath end-member 48 and strut 46 of the rear frame member 37. The discs 51 are positively spaced from each other by sleeve members 51b on shaft 51a. It is to be observed that one end disc 51c and 50c of each of the gangs of discs carried by rear frame member 37 are spaced substantially from the end frames 48 and 49. As distinguished from this, the scalloped discs in the front frame member 12 have an end disc 24c and 25c disposed immediately adjacent the end frames 33 and 32. This provides for a sufficient off-set relation between the discs to secure more effective pulverization of the earth. Conversely, the inner discs 51d and 50d are disposed directly against the struts 46 and 47 respectively in the rear frame member 37 whereas the discs 25d and 24d are disposed in spaced relation to the struts 30 and 31 in the front frame member 12 with respect to the discs of the rear frame member 37.

The rear frame member 37 is also provided with upstanding sets of brackets 58 and 59 on the front portion thereof which serves as engagement means for the vertically extending members 6 and 7 of the coupling means to the tractor when the front frame member 12 is eliminated and connection is to be made between the tractor and the rear frame member 37 direct and without the interposition of the front frame member 12. This condition is illustrated more particularly in Fig. 5. The rear frame member 37 also carries bracket 60 corresponding to brackets 21 and 22 on the front frame member 12 for connection of the adjustment means 17—18 thereto as will be explained more fully hereinafter.

The scalloped discs in the front frame member 12 serve to cut and pulverize the earth while the circular discs in the rear frame section 37 operate to further pulverize the earth in co-action with the preceding circular discs.

The agriculture equipment of my invention is useful in the treatment of earths of different characteristics and there are many conditions where the tandem operation of the front and rear frame members will not satisfactorily perform. Under certain conditions it becomes highly desirable to fold the rear frame member 37 over the front frame member 12 as represented in Fig. 3 whereupon the mass of the discs and rear frame member 37 are moved to a position where the center of gravity thereof is substantially over the discs in the front frame member 12. Under these conditions the rear frame member 37 rests against adjustment bar 17 and channel 18 as an abutment stop as shown in Fig. 3 and provides a stabilized, concentrated weight rendered effective against the earth through the scalloped gangs of discs 24 and 25 in the front frame member 12.

As shown in Fig. 4 there are conditions where the entire rear frame member 37 may be disconnected from the front frame member 12 and the front frame member 12 employed independently of rear frame member 37 in the manner set forth in Fig. 4.

Also there are conditions heretofore alluded to in which the entire front section 12 should be eliminated and the rear section 37 utilized independently of the front frame member 12 in the arrangement shown in Fig. 5. When the rear frame member 37 is employed without the interposition of the front frame member 12 the coupling means comprising members 6 and 7 are removed from the front section 12 and coupled to the sets of lugs brackets 58 and 59 on the rear frame member 37 and the adjustment bar 17 and channel-shaped member 18 connected therein at bolt member 16 and to the bracket members 60 which are provided on the rear of the rear frame member 37, channel-shaped member 18 being pivoted therein as represented at 61. Thus the rear frame member 37 when shifted to the front of the implement may be adjusted for depth of penetration in the same manner that front frame member 12 was adjusted for depth of penetration.

I have found the implement of my invention highly practical in its manufacture, production and use, for the implement serves a multiplicity of purposes enabling one implement to do work ordinarily performed by different implements.

While I described my invention in certain of its preferred embodiments I realize that modifications may be made in the details of construction of the equipment, and I desire that it be understood that no limitations upon my invention are intended other than may be imposed by the scope of the appended claims.

What I claim as new and desire to secure by Letters Patent of the United States is as follows:

1. A combination multiple and single section lift type disc harrow comprising a pair of substantially coplanar frame members, oppositely facing harrow disc units supported in depending relation beneath each of said frame members, means on the leading edge of one of said frame members connectible with a tractor, said last mentioned frame member having a linearly extending trailing edge, hinge members on said trailing edge of said last mentioned frame member, the other of said frame members having a leading edge coextensive with the trailing edge of the aforementioned frame member and establishing a linear abutment when said frame members are disposed in coplanar relation, hinge members on the leading edge of said last mentioned frame member aligned with the hinge members on said first mentioned frame member, means pivotally interconnecting said hinge members whereby said second mentioned frame member may be moved vertically through an orbit confined within the limits of the width of the front frame member in the direction of said first mentioned frame member to a position whereby the harrow disc units supported thereby over the harrow disc units supported by said first mentioned frame member concentrate the mass thereof through the harrow units carried by said first mentioned frame member, said coextensive edges of said frame members restricting said second mentioned frame member against downwardly hinged movement with respect to said first mentioned frame member.

2. A combination multiple and single section lift type disc harrow as set forth in claim 1 including an abutment on said first mentioned frame member in which the means pivotally interconnecting said hinge members are linearly spaced from said frame members for maintaining said frame members in spaced positions when said second mentioned frame member is moved to a position over said first mentioned frame member, against said abutment whereby the edges of the harrow disc units carried by the second mentioned frame member are elevated in spaced relation over the edges of the harrow disc units carried by the first mentioned frame member.

3. A combination multiple and single section lift type disc harrow as set forth in claim 1 in which said abutment comprises a member extending between said means connectible to a tractor and a central position on the trailing edge of said first mentioned frame member and constitutes a limiting abutment for restricting the angular movement of said second mentioned frame member over said first mentioned frame member.

4. A combination multiple and single section lift type disc harrow as set forth in claim 1 which includes connectible and disconnectible means engageable between the trailing edge of said first mentioned frame member and the leading edge of said second mentioned frame member in a plane beneath the means pivotally interconnecting said hinge members and disconnectible to allow said second mentioned frame member to be swung in an orbit over said first mentioned frame member.

JACKSON PERRY ROBERTSON.

References Cited in the file of this patent

UNITED STATES PATENTS

| Number | Name | Date |
|---|---|---|
| 470,401 | Richmond | Mar. 8, 1892 |
| 792,294 | Svanljung | June 13, 1905 |
| 2,098,116 | Warne | Nov. 2, 1937 |
| 2,141,805 | White | Dec. 27, 1938 |
| 2,320,624 | Love | June 1, 1943 |
| 2,352,963 | McMahon | July 4, 1944 |
| 2,377,521 | Rutter | June 5, 1945 |
| 2,398,147 | McKay | Apr. 9, 1946 |
| 2,440,550 | Martin | Apr. 27, 1948 |
| 2,456,693 | Fraga | Dec. 21, 1948 |